United States Patent [19]
Johnson et al.

[11] Patent Number: 5,398,625
[45] Date of Patent: Mar. 21, 1995

[54] GRAIN DRILL UNIT HAVING SEED FIRMING WHEEL

[75] Inventors: Eric Johnson; J. Michael McClure; James I. Van Blaricon, all of Salina, Kans.

[73] Assignee: Great Plains Manufacturing, Incorporated, Assaria, Kans.

[21] Appl. No.: 850,559

[22] Filed: Mar. 13, 1992

[51] Int. Cl.⁶ ............................................. A01C 5/06
[52] U.S. Cl. ................... 111/189; 111/194; 111/164; 172/747; 172/265; 301/64.7
[58] Field of Search ............... 111/136, 143, 189, 164, 111/190, 194–196; 172/264, 265, 269, 705, 710, 747; 301/64.7, 64.1, 64.2

[56] References Cited

U.S. PATENT DOCUMENTS

| | | | |
|---|---|---|---|
| 636,342 | 11/1899 | Lambert | 172/710 |
| 812,382 | 2/1906 | Thieleu | 172/710 |
| 2,366,389 | 1/1945 | Deavenport | 111/189 |
| 2,710,230 | 6/1955 | Tea | 301/64.1 |
| 2,738,969 | 3/1956 | Morris et al. | 111/189 |
| 2,963,998 | 12/1960 | Bliss | 111/189 |
| 2,968,266 | 1/1961 | Gustafson | 111/190 |
| 3,148,644 | 9/1964 | Keeton | 111/189 |
| 3,237,702 | 3/1966 | Ovendorff | 111/189 |
| 3,491,709 | 1/1970 | Fleischer et al. | 111/189 |
| 4,273,057 | 6/1981 | Pollard | 111/195 |
| 4,278,036 | 7/1981 | Bachele | 111/194 |
| 4,307,674 | 12/1981 | Jennings et al. | 111/189 |
| 4,311,104 | 1/1982 | Steileu et al. | 111/194 |
| 4,321,971 | 3/1982 | Hake et al. | 172/710 |
| 4,664,202 | 5/1987 | Applequist et al. | 111/57 |
| 4,762,075 | 8/1988 | Halford | 111/194 |
| 5,022,333 | 6/1991 | McClure et al. | 111/136 |
| 5,025,736 | 6/1991 | Anderson | 111/124 |
| 5,104,198 | 4/1992 | Prout et al. | 301/64.7 |
| 5,133,591 | 7/1992 | Skaggs et al. | 301/64.7 |
| 5,159,887 | 11/1992 | Poll | 111/109 |

FOREIGN PATENT DOCUMENTS 261793  1/1970  U.S.S.R. ................. 111/189

*Primary Examiner*—Randolph A. Reese
*Assistant Examiner*—Spencer Warnick
*Attorney, Agent, or Firm*—Hovey, Williams, Timmons & Collins

[57] ABSTRACT

A seed firming wheel assembly is supported in close-coupled relationship with the rear portion of the paired discs of an opener to gently press deposited seeds down into the bottom of a V-shaped trench formed by the discs. The mounting arm of the assembly is configured in a manner to minimize the accumulation of mud and trash residue, while the wheel itself may take the form of a solid, circular block of ultra-high-molecular-weight polyethylene with slick sides to reduce soil adherence or a spoked, molded plastic wheel having open spaces between the spokes to permit soil pass-through.

27 Claims, 4 Drawing Sheets

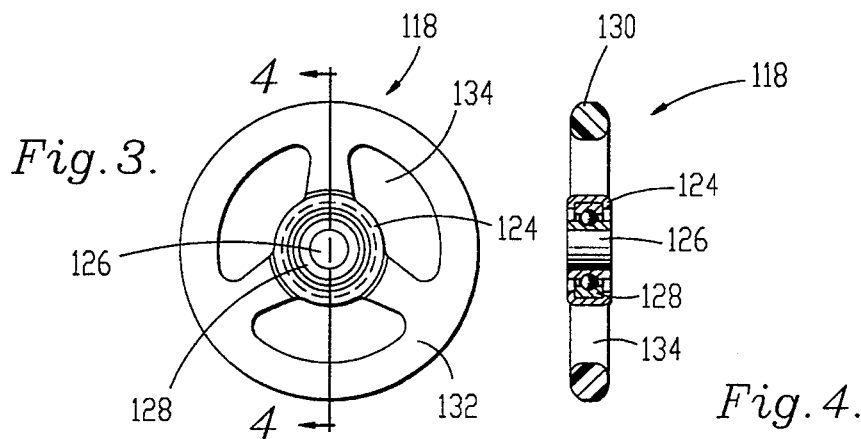
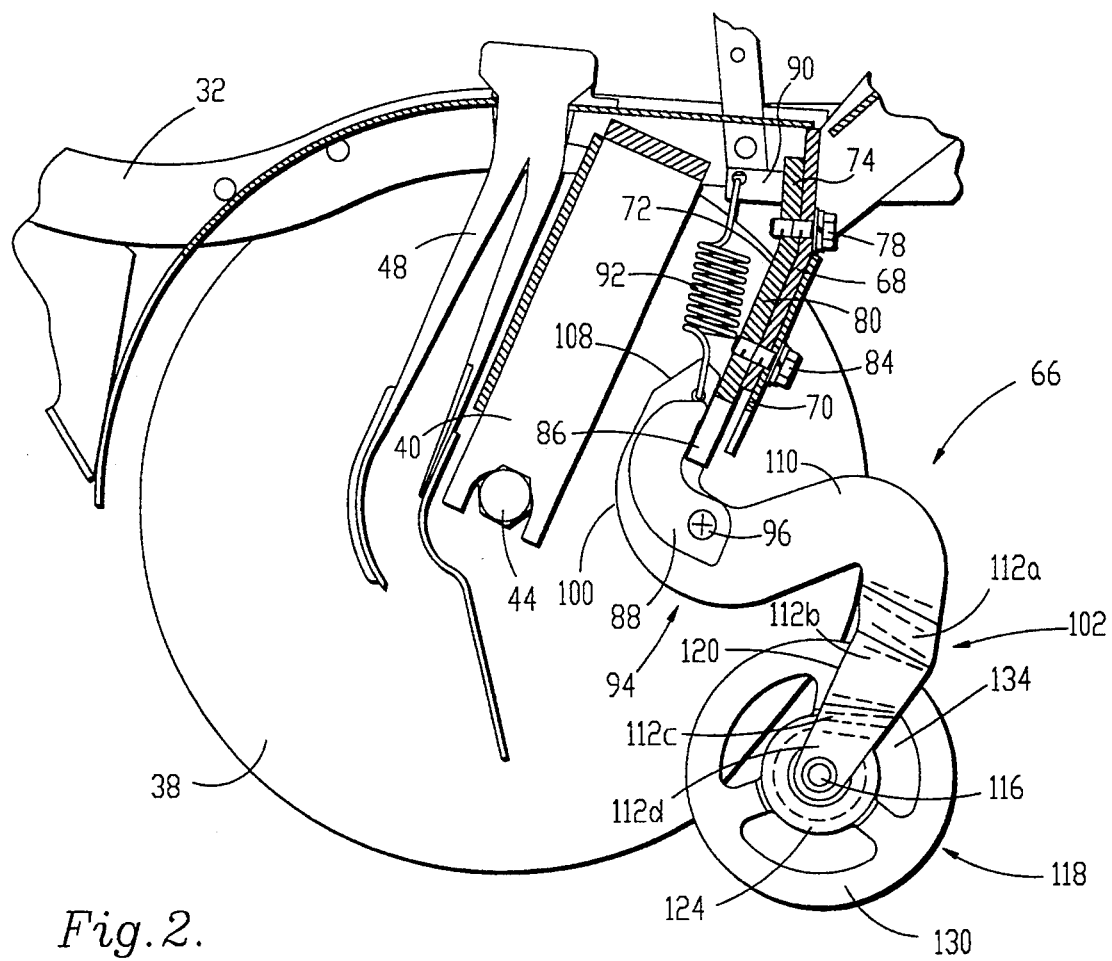

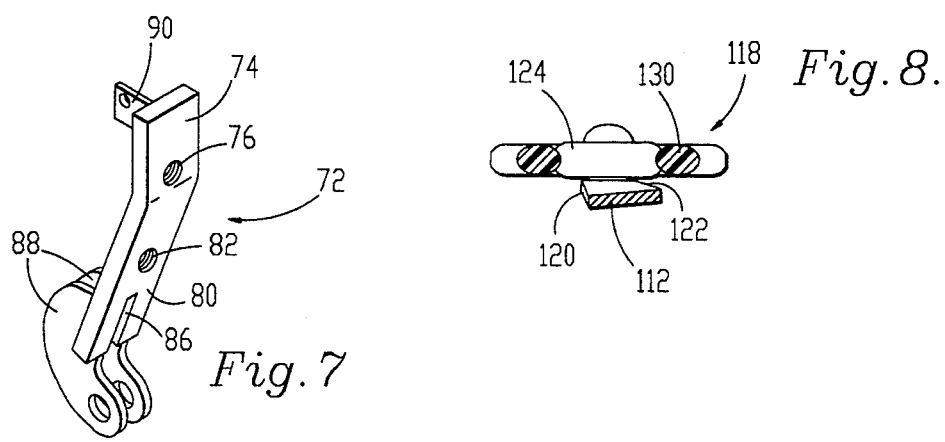
Fig. 8.
Fig. 7.
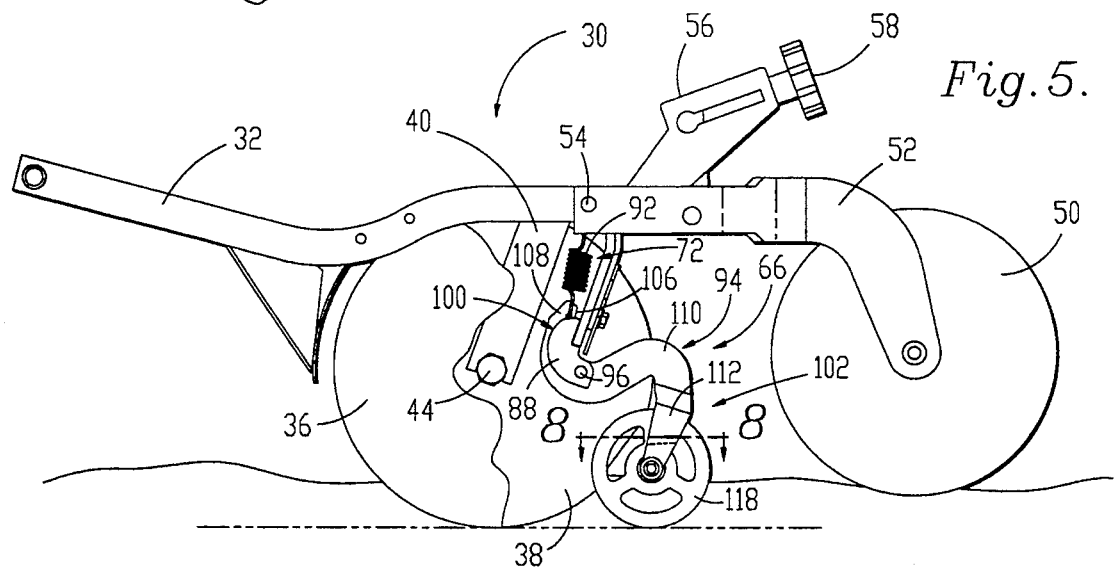
Fig. 5.
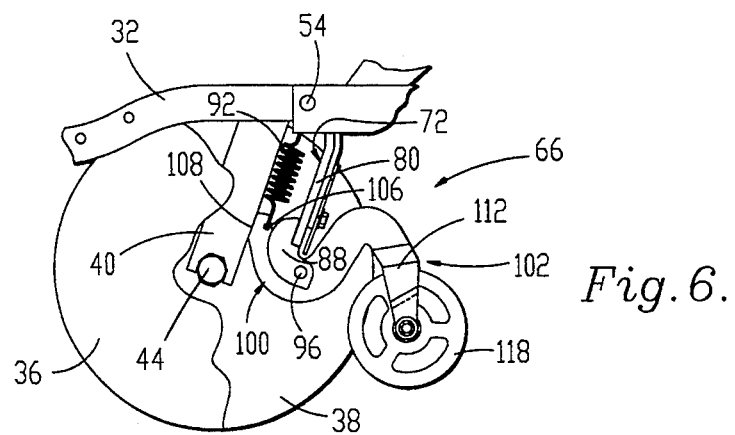
Fig. 6.

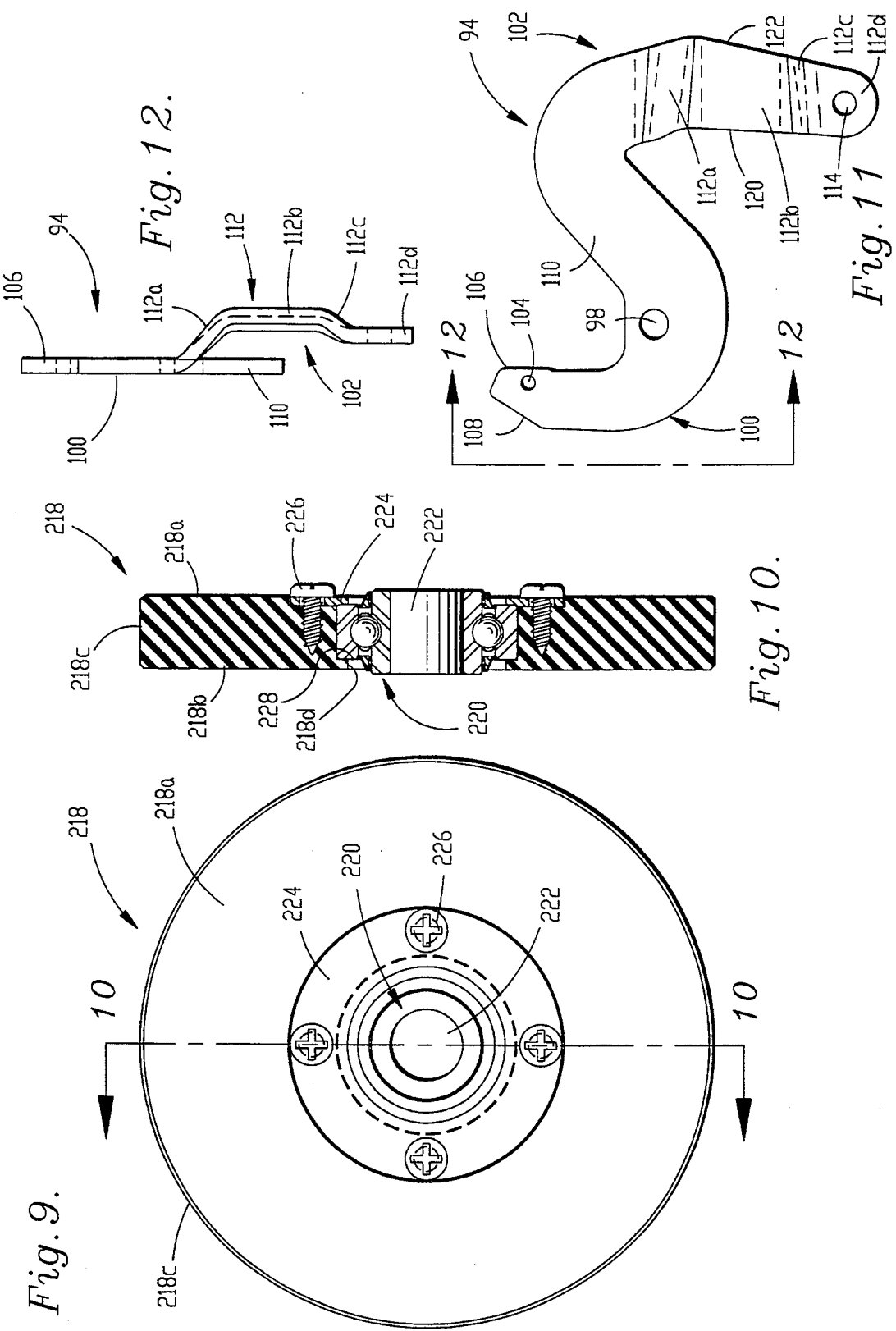

GRAIN DRILL UNIT HAVING SEED FIRMING WHEEL

TECHNICAL FIELD

This invention relates to grain drills and, more particularly, to a seed firming wheel assembly which accompanies the double-disc opener of such a drill for gently pressing deposited seeds down into the loose soil at the bottom of a trench formed by the two discs of the opener.

BACKGROUND

After seeds have been deposited in a trench formed by a pair of opener discs, it is desirable to press the seeds gently down into the soil at the bottom of the trench before the trench is then covered over with soil by the trailing press wheel. A variety of small firming wheels have heretofore been provided by various manufacturers for accomplishing this function.

However, one nagging problem associated with currently available firming wheels is the accumulation of trash residue and mud in and around the firming wheels. When the buildup of this type of material becomes great enough, it will actually interfere with the rolling action of the wheel and may cause it to stop rolling all together, turning the wheel into more of a gouging device than something that gives the seed its final setting into place.

SUMMARY OF THE INVENTION

Accordingly, one important object of the present invention is to provide a seed firming wheel assembly, particularly usable in connection with the paired opening discs of a grain drill, which gently yet firmly presses the deposited seeds into the soil at the bottom of the trench prepared by the discs while minimizing the opportunity for the collection and buildup of trash crop residue and mud. More particularly, in an opener in which there is a press wheel which trails the firming wheel and the press wheel is utilized as a means for gauging the depth of the discs, it is an important aim of the invention to provide for gentle firming action on the part of the seed firming wheel without causing the firming wheel to take over the depth gauging function of the press wheel. In other words, an important consideration is to provide a firming wheel which is capable of carrying out its delicate seed firming function without adversely affecting the ability of the press wheel to carry out its depth gauging function.

Pursuant to the foregoing, the present invention contemplates having a seed firming wheel assembly which is mounted in a close-coupled relationship with the rear extremities of the paired discs so that there is little, if any, space behind the discs for trash and mud to accumulate on the wheel assembly. In order to accomplish this close coupling relationship, relatively slender mounting structure is arranged in the narrow space between the paired discs along their rear margin, and only that portion of the assembly having a width which might interfere with the discs is positioned rearwardly beyond the discs themselves. While a primary mounting arm of the firming wheel is constructed from flat, plate material and thus presents a relatively narrow profile which is easily received between the discs, an offset joggle in the arm is necessary in order to maintain the wheel on the centerline of the discs, and such offset portion is positioned to the rear of the discs so as to avoid interference problems. That section of the arm which is disposed to the rear of the discs is curved downwardly in a manner to follow the contour of the discs as closely as possible so as to avoid the entrapment of trash and mud. A return spring on the mounting arm of the wheel yieldably biases the wheel toward a lower limit position slightly below the discs so that during actual use the firming wheel runs at or slightly above the bottom edge of the discs under down pressure from the spring. In its preferred form, the wheel is a substantially solid circular member constructed of ultra-high-molecular-weight polyethelyene material, although an alternative embodiment provides the wheel with an open spoke construction which allows the passage of soil through the space between its spokes.

BRIEF DESCRIPTION OF THE DRAWINGS

FIG. 2 is an enlarged, fragmentary elevational view thereof with the near disc removed to reveal internal details of construction, certain parts being shown in cross-section for clarity;

FIG. 3 is a side elevational view of one embodiment of a seed firming wheel in accordance with the principles of the present invention;

FIG. 4 is a vertical cross-sectional view through the firming wheel embodiment of FIG. 3;

FIG. 5 is a side elevational view of the double disc opener in use with the near disc partially broken away to reveal the firming seed wheel assembly between the discs;

FIG. 6 is a fragmentary side elevational view similar to FIG. 5, but illustrating the firming wheel swung upwardly against the action of its biasing means to the limit of its upswinging travel;

FIG. 7 is a perspective view of a mounting bracket of the firming wheel assembly;

FIG. 8 is a slightly enlarged, transverse cross-sectional view of the firming wheel of FIG. 5 taken substantially along line 8—8 of that figure;

FIG. 9 is a side elevational view of a second embodiment of the firming wheel comprising a solid, non-spoked wheel constructed of ultra-high-molecular-weight polyethylene;

FIG. 10 is a vertical cross-sectional view of the solid wheel taken substantially along line 10—10 of FIG. 9;

FIG. 11 is a side elevational view of the swingable mounting arm for the firming wheel; and FIG. 12 is an end elevational view of the swing arm of FIG. 11 taken substantially along sight line 12—12 thereof.

DETAILED DESCRIPTION

Figure 1:
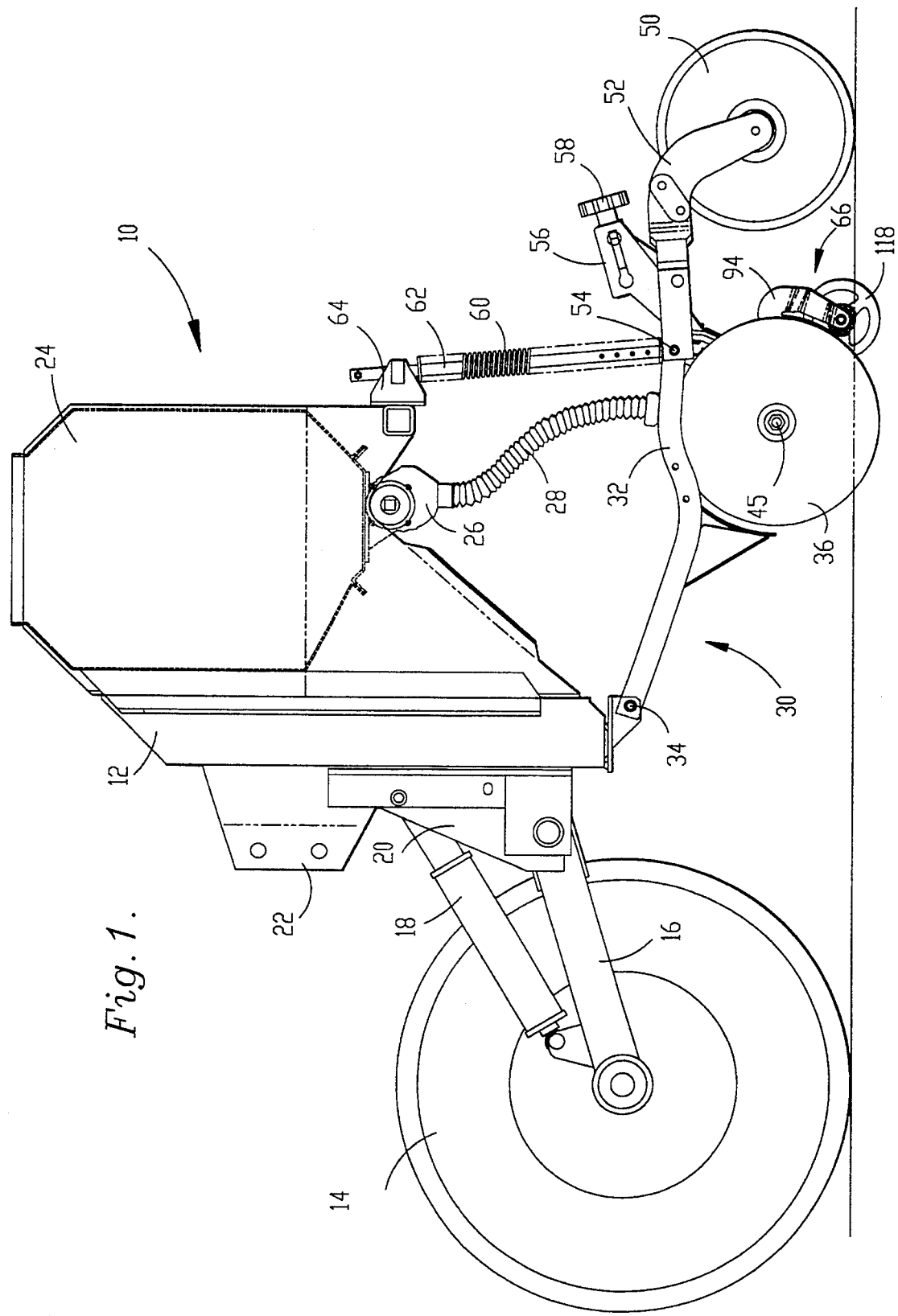
FIG. 1 is a side elevational view of a grain drill employing a double disc opener having a seed firming wheel assembly associated therewith in accordance with the principles of the present invention.

The grain drill 10 illustrated in FIG. 1 may take a variety of different forms within the scope of the present invention. For the sake of illustration, the drill 10 comprises a "Solid Stand 3-point Drill" commercialized by the assignee of the present invention and disclosed in somewhat more detail as part of a folding drill in U.S. Pat. No. 4,664,202. The '202 patent is hereby incorporated by reference into the present application as may be necessary for a full and complete understanding of the present invention.

The drill 10 includes a main transverse frame 12 which is partially supported by ground wheels 14 (only one being shown) located in front of the frame 12 and height-controlled by a vertically swingable mounting arm 16 and an extendible and retractable link 18. The arm 16 is swingably connected to the front of the frame 12 while the link 18 extends between the front end of the arm 16 and the frame 12. A pair of lower 3-point mounting brackets 20 spaced along the front of the frame 12 (only one of such brackets 20 being illustrated) and a third, upper bracket 22 located centrally between the two lower brackets 20 comprise 3-point mounting structure for attaching the drill 10 to either the 3-point hitch of a towing tractor or of a suitable pull-type frame. A seed box 24 carried by the frame 12 delivers a steady supply of seeds toward the ground through a metering cup 26 and a flexible hose 28 leading from the metering cup 26.

The drill 10 also includes a plurality of opener units 30 (only one being shown) secured to the frame 12 at spaced locations across the width of the machine according to the desired row spacing. Each of the openers 30 includes a generally fore-and-aft extending sub-frame 32 swingably mounted at its front end to the frame 12 via a transverse pivot 34. Near the fore-and-aft midpoint of each sub-frame 32, the sub-frame is provided with a pair of side-by-side, downwardly and forwardly converging opener discs 36 and 38 that penetrate the soil to a certain depth as the drill is advanced and thus form a generally V-shaped trench or seed groove in the soil. A slightly forwardly inclined mounting bar 40 (FIGS. 2, 5, and 6) projects down from sub-frame 32 on the fore-and-aft centerline of the opener unit and supports the discs 36,38 for rotation about slightly downwardly and forwardly projecting axes of rotation. The bar 40 has a pair of nuts 44 welded to opposite sides thereof at slightly downwardly and forwardly inclined angles for receiving respective mounting bolts 45 of the discs 36,38, each of the latter having its own bearing assembly journaled on the corresponding bolt 45.

As illustrated in FIG. 2, a seed drop tube 48 is carried by each sub-frame 32 and depends therefrom into the space between the forwardly converging discs 36,38 slightly ahead of the pivot shafts 44,46, although the lowermost discharge end 48a of the tube 48 is disposed below the pivot shafts 44,46 and substantially in fore-and-aft alignment therewith such that seeds gravitating from the drop tube 48 fall into the trench immediately after its preparation by the converging discs 36,38.

As shown in FIGS. 1 and 5, the depth of penetration of the discs 36,38 is controlled and regulated by one or more press wheels 50 adjustably secured to the rear end of the sub-frame 32. As well understood by those skilled in the art, the press wheel 50, which may be of a variety of configurations, is mounted on a generally fore-and-aft extending lever arm 52 pivotally coupled at its front end with the sub-frame 32 via a transverse pivot 54. The lever arm 52 is held in a selected vertical position about the pivot 54 by control mechanism 56 which operably interconnects the sub-frame 32 and the lever arm 52. A hand knob 58 of the control mechanism 56 allows the operator to adjust the position at which the lever arm 52 and the press wheel 50 are held relative to the discs 36,38. Down pressure for the discs 36,38 is provided by one or more compression springs 60 coiled about an upright guide rod 62 and trapped between the sub-frame 32 and a shoulder 64 fixed to the rear of the frame 12 behind the seed box 24.

In accordance with the present invention, the opener 30 is provided with a seed firming wheel assembly broadly denoted by the numeral 66 and situated generally between the press wheel 50 and the rear of the discs 36,38. As illustrated in FIG. 2, the sub-frame 32 has a rigid, generally upright strap 68 fixed thereto and depending therefrom which serves as a convenient mounting means for the assembly 66. The strap 68 also serves as a convenient means for supporting a blade-type scraper 70 between the upper rear portions of the discs 36,38 for scraping away mud and other materials that might tend to accumulate between the discs in that area.

The strap 68 is slightly angled forwardly and carries along its front side a complementally angled mounting bracket 72 of the wheel assembly 66. The bracket 72 is shown in an isolated condition in FIG. 7, and reference may be made to that figure if need be for a full understanding of the nature and configuration of the bracket 72.

It will be noted that the bracket 72 includes an upper, relatively short leg 74 having a threaded mounting hole 76 (FIG. 7) that receives a threaded fastener 78 which secures the leg 74 to the adjacent portion of the strap 68. Likewise, a lower, longer leg 80 of the bracket 72 has a transverse threaded hole 82 which receives a second threaded fastener 84 passing through both the strap 68 and the scraper 70. The lowermost end of the leg 80 has an upwardly extending trash clearance notch 86, as well as a pair of generally kidney-shaped mounting ears 88 that are rigidly fixed to the front face of the leg 80 on opposite sides of the clearance notch 86 and which project downwardly beyond the lowermost extremity of the leg 80. A rigid tab 90 projects forwardly from the upper leg 74 to serve as an attaching point for a tension spring 92 which yieldably biases the wheel assembly 66 toward a lowered position in a manner yet to be described.

The firming wheel assembly 66 also includes a generally S-shaped mounting arm 94 which is pivotally mounted intermediate its ends between the two kidney-shaped ears 88 by a transverse pivot 96. As illustrated in FIGS. 11 and 12, the mounting arm 94 is formed from an initially flat piece of plate material so as to present a relatively thin profile, except in those areas in which the arm 94 is joggled outwardly as described hereinafter. A transverse hole 98 for the pivot 96 effectively divides the arm 94 into a front section generally denoted by the numeral 100 and a rear section likewise generally denoted by the numeral 102. The front section 100 is upturned and is provided with a small hole 104 adjacent its upper end which receives the lower end of the coil spring 92 such that the spring 92 yieldably biases the arm 94 in a clockwise direction viewing FIGS. 2, 5, 6, and 11. Along its inboard margin, the front section 100 has a stop edge 106 which is disposed to abut the proximal front face of the bracket 72 when the mounting arm 94 is in the position of FIGS. 2 and 5 whereby to limit the clockwise rotation of the arm 94. A somewhat similar although inclined stop edge 108 on the outboard margin of the front section 100 of arm 94 is disposed to abut the proximal disc mounting bar 40 when the arm 94 is rotated to the position illustrated in FIG. 6. Thus, it will be seen that the arm 94 is adapted to rotate through an arc of approximately 30°, limited at its opposite extremes by the bracket 72 and the disc mounting bar 40.

The rear section 102 of the mounting arm 94 has an upswept length 110 immediately behind the pivot 96 and hole 98 followed by a downturned length 112 which is joggled out in a lateral direction relative to the plane of the upswept length 110 and the front section 100. As illustrated in FIG. 2, the upswept length 110 is just long enough to reach the rear periphery of the discs 36,38, at which point the downturned length 112 begins and extends immediately to the rear of the rear periphery of the discs 36,38. It will be seen that when the arm 94 is in the lower position of FIGS. 1, 2, and 5, the forward edge of the downturned length 112 generally conforms to and is in close proximity with the rear arcuate periphery of the discs 36,38 so as to limit the opportunity for trash materials to become trapped between the rear of the discs 36,38 and the downturned length 112 of the arm 94.

As illustrated in particular in FIG. 12, the joggled out downturned length 112 includes an initial outturned segment 112a, an intermediate parallel segment 112b which is parallel to the upswept length 110 and the front section 100, an inturned, return segment 112c approximately half the length of the outturned segment 112a, and a final tip portion 112d which lies in a plane parallel to the upswept length 110 and the intermediate segment 112b. The tip portion 112d is provided with an opening 114 which serves to mount a transverse stub axle shaft 116 associated with a firming wheel 118 of the assembly 66.

It will be understood that the wheel 118 is ideally disposed on an imaginary, fore-and-aft centerline passing between the discs 36,38 such that the wheel 118 rides within the trench formed by the discs 36,38 during use. Such strategic positioning of the wheel 118 is achieved by virtue of the joggled nature of the downturned length 112 of the rear section 110 of mounting arm 94. It will also be noted from FIGS. 1 and 2 in particular that the joggled downturned length 112 is positioned to the rear of the periphery of the discs 36,38 so as not to interfere with the free rotation of the two discs 36,38 themselves, notwithstanding the additional width inherent in the otherwise flat mounting arm 94 afforded by the joggled portion. It will also be noted that because of the intimate relationship between the downturned length 112 of the arm 94 and the rear periphery of the discs 36,38, the wheel 118 is close-coupled with the discs 36,38 and in fact has its forward half projecting into the space between the two discs.

It is to be noted that the parts of the firming wheel assembly 66 are so configured and arranged that when the stop edge 106 of arm 94 is against the bracket 72 as in FIGS. 1, 2, and 5, the wheel 118 projects a short distance down below the lowermost extremity of the discs 36,38. However, the coil spring 92 is so designed as to permit the wheel 118 to readily swing up out of its lowermost position in the event obstacles such as clods, stones, or trash materials are encountered. In fact, the spring force of spring 92 is selected so that, in use, the firming wheel 118 is incapable of bearing the weight of the opener 30 and serving as the depth gauging means in lieu of the press wheel 50. In one exemplary embodiment, a spring having a spring rate of 27.5 lbs. per inch with 8.8 active coils and a maximum extended length of 4⅜ inches has been found to be effective. The initial tension of such spring is approximately 7.1 lbs.

As shown best in FIGS. 8 and 12, the downturned length 112 of the arm 94 is twisted slightly out of a truly vertical plane, on the order of approximately 5°, (except for the tip 112d) so that its leading edge 120 is spaced slightly farther away from the proximal surface of the wheel 118 than the trailing edge 122. Thus, in effect, the downturned length 112 in portions 112a, 112b, and 112c thereof diverges outwardly away from the proximal surface of the wheel 118 in a forward direction with respect to the normal path of travel of the firming wheel assembly 66, such diverging relationship helping to release mud and trash materials that might otherwise become trapped between the downturned length 112 and the wheel 118.

The wheel 118 illustrated in FIGS. 1–8 represents one embodiment of a wheel usable in accordance with the present invention. Such wheel 118 is preferably molded from a synthetic resinous material such as Xenoy-6370 which is available from General Electric Company. A central, circular hub 124 of the wheel 118 has a concentric bore 126 therethrough which is defined by a molded-in bearing 128 journaled on the pivot 116 at the lower end of the arm 24. An outer rim 130 of the wheel 118 is joined with the hub 124 by three radially extending, circumferentially spaced apart spokes 132 disposed at 120° intervals about the periphery of the inner hub 124.

In some conditions, the open spaces 134 between the spokes 132 may tend to trap stalks and other materials during field use of the equipment, although the spaces 134 also permit the pass-through of soil and clods. Thus, a preferred form of the firming wheel, if accumulation of foreign material between the spokes 132 is a concern, is illustrated in FIGS. 9 and 10 and is denoted broadly by the numeral 218. It will be seen that the wheel 218 is constructed from a solid circular block of synthetic resinous material and has no spokes or spaces between such spokes as part of its configuration. Instead, the opposite sides of the solid wheel 218 simply comprise flat faces 218a and 218b which extend from the outermost periphery 218c to an inner circular periphery 218d, at which location a bearing assembly 220 is located. The bearing assembly has a centrally defined bore 222 therethrough which receives the pivot pin 116 of the wheel assembly 66. An annular retaining flange 224 is secured to the face 218a of the wheel 218 by a plurality of screws 226 to assure that the bearing assembly 220 remains seated against an internal shoulder 228 within the wheel 218.

In its preferred form, the solid wheel 218 is formed from an ultra-high-molecular-weight polymer (UHMW) which is selected because of its extremely high abrasion resistance, its exceptional impact resistance and its non-stick surface characteristics. Thus, the wheel 218 is relatively long wearing, yet resists the adherence and accumulation of mud and other materials to its various surfaces. One source of the product is the Poly Hi Company of Ft. Wayne, Ind., as ⅜ inch thick black static-reduced TIVAR-100 having a molecular weight of 4.5–5.67 million.

Operation

As the drill 10 advances and the discs 36,38 prepare a seed receiving trench in the soil, the seeds are dropped into the trench through the drop tube 48 and are immediately engaged by the firming wheel 118, or 218 if the solid wheel version is utilized. Regardless of which of the wheels 118 or 218 is selected for use, the gentle, seed firming action is the same in either case.

Using the wheel 118 for purposes of illustration, it will be appreciated that the wheel 118 does not bear the weight of the opener 30 or in any way detract from the full functional effect of the gauging press wheel 50. Instead, because of the light-duty nature of the spring 92, the wheel 118 rides only gently over the deposited seeds and gives them a final firming touch that sets them down into the loose, moist soil at the bottom of the trench. Thus, all of the seeds are more assured of being set into the soil at precisely the same depth, which results in more uniform germination and emergence. In the event some loose soil may have slipped into the trench slightly covering the seeds before the wheel 118 comes along, such soil will simply be firmly covered over the seeds such that the seeds are still gently tucked down into the seed bed at the proper depth.

As illustrated, for example, in FIG. 2, the firming wheel 118 is normally set to project down slightly below the bottom extremity of the opener discs 36,38. However, under actual running conditions, the arm 94 will be swung upwardly to a slight extent so that the firming wheel 118 is no deeper than the discs 36,38 and the spring 92 provides an appropriate amount of down pressure to the wheel 118 as it rolls in the trench. In the event a large obstacle is encountered by the wheel 18, the arm 94 can yield substantially upwardly as illustrated in FIG. 6 until the stop edge 108 abuts the bar 40, limiting such movement. As earlier described, the downward extent of movement of the firming wheel 118 is determined by the stop edge 106 as it abuts against the mounting bracket 72.

The design of the firming wheel assembly 66 is such as to minimize the collection and adherence of trash materials and mud. In this regard, having the wheel mounting portion of the arm 94 turned downwardly so that it normally extends in a generally upright attitude as exemplified by the down swept length 112 helps shed materials that would otherwise tend to accumulate in that area. Moreover, having the downturned length 112 positioned in close, intimate proximity to the rear edge of the discs 36,38 minimizes the space available for materials to become wedged between the trailing periphery of the discs 36,38 and the downturned length 112. As earlier mentioned, the slightly arcuate nature of the downturned length 112 as it conforms generally to the rear peripheries of the discs 36,38 also helps in this respect.

Also of significance is the fact that the downturned length 112 of the arm 94, with the exception of the lowermost tip portion 112d, is flared outwardly away from the proximal surface of the wheel 118. Thus, mud, soil particles, and trash residue that might tend to cling to the upwardly moving rear periphery of the wheel 118 and approach the downturned portion 112 are immediately released after passing the downturned portion 112, instead of being wedged into a more confined environment. This helps keep the wheel 118 rolling so that it does not skid and gouge along the bottom of the seed trench. The plastic nature of the wheels 118 and 218 is also helpful in that non-stick surfaces are thus provided so that the wheels more readily shed soil particles that would otherwise tend to adhere to such surfaces.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a double-disc opener for use with a grain drill having a main frame, the improvement comprising:
   an elongated, normally fore-and-aft extending sub-frame having a front end;
   means adjacent said front end of the sub-frame for pivotally mounting the sub-frame on the main frame of the drill for up and down swinging movement;
   a pair of side-by-side discs rotatably carried by said sub-frame behind the mounting means and converging slightly downwardly and forwardly for opening a trench in the soil as the opener is advanced;
   seed deposit means on the sub-frame for releasing seeds into the trench formed by the discs;
   a trailing press wheel carried by said sub-frame behind the seed deposit means at a selected vertical position relative to the sub-frame for gauging the depth of penetration of the discs into the soil and for covering the trench with soil after seeds have been deposited; and
   a seed firming wheel assembly carried by the sub-frame between the seed deposit means and the press wheel and including a firming wheel positioned for rolling movement in the trench to gently sink the deposited seeds into the soil at the bottom of the trench,
   said assembly including spring means yieldably biasing the firming wheel toward a lowermost operating position with a level of force which is insufficient to cause the firming wheel to support the weight of the opener during operation and transfer the depth gauging function from the press wheel to the firming wheel,
   said firming wheel comprising a non-spoked, circular disc having solid side faces and constructed from ultra-high-molecular-weight polyethylene,
   said firming wheel being positioned to project forwardly into a space formed between the discs while a rear portion of the firming wheel projects rearwardly behind the discs,
   said assembly including an elongated arm having a pair of opposite ends,
   said arm being pivoted intermediate its opposite ends for up and down swinging movement about a transverse pivot located below the sub-frame and between the discs,
   said arm having said spring means located at one of said opposite ends and the firming wheel at the other of said opposite ends,
   said arm having an arcuately downturned section adjacent the other of said opposite ends which generally matches the arcuate contour of said discs along a trailing portion of the discs.

2. In a double-disc opener for use with a grain drill having a main frame, the improvement comprising:
   an elongated, normally fore-and-aft extending sub-frame having a front end;
   means adjacent said front end of the sub-frame for pivotally mounting the sub-frame on the main frame of the drill for up and down swinging movement;
   a pair of side-by-side discs rotatably carried by said sub-frame behind the mounting means and converging slightly downwardly and forwardly for opening a trench in the soil as the opener is advanced;

seed deposit means on the sub-frame for releasing seeds into the trench formed by the discs;

a trailing press wheel carried by said sub-frame behind the seed deposit means at a selected vertical position relative to the sub-frame for gauging the depth of penetration of the discs into the soil and for covering the trench with soil after seeds have been deposited; and a seed firming wheel assembly carried by the sub-frame between the seed deposit means and the press wheel and including a firming wheel positioned for rolling movement in the trench to gently sink the deposited seeds into the soil at the bottom of the trench, said assembly including spring means yieldably biasing the firming wheel toward a lowermost operating position with a level of force which is insufficient to cause the firming wheel to support the weight of the opener during operation and transfer the depth gauging function from the press wheel to the firming wheel, said firming wheel comprising a non-spoked, circular disc having an outermost, circular periphery and solid side faces all constructed from the same material, said material comprising ultra-high-molecular-weight polyethylene.

3. In a double-disc opener as claimed in claim 2, said firming wheel being positioned to project forwardly into a space formed between the discs while a rear portion of the firming wheel projects rearwardly behind the discs.

4. In a double-disc opener as claimed in claim 3, said assembly including an elongated arm having a pair of opposite ends, said arm being pivoted intermediate its opposite ends for up and down swinging movement about a transverse pivot located below the sub-frame and between the discs, said arm having said spring means located at one of said opposite ends and the firming wheel at the other of said opposite ends.

5. In a double-disc opener having a pair of generally downwardly and forwardly converging discs which prepare a seed trench in the soil as the opener is advanced, an improved seed firming wheel assembly comprising:

an arm pivotally mounted between the discs for up and down swinging movement about a transverse axis located behind the axes of rotation of the discs, said arm being provided with means yieldably biasing a rear section of the arm in a downward direction; and a firming wheel rotatably supported on said rear section of the arm in such a position that a front portion of the firming wheel projects into a space defined between the two discs at the rear thereof while a rear portion of the firming wheel projects rearwardly beyond the discs, whereby to reduce the accumulation of trash and residue on the firming wheel during operation, said firming wheel comprising a non-spoked, circular disc having solid side faces and constructed from ultra-high-molecular-weight polyethylene, said rear section of the arm including a generally upright, flat surface located beside a normally upper area of the firming wheel, said flat surface of the arm section being twisted out of a plane parallel to the plane of rotation of the firming wheel and into a plane diverging forwardly away from the firming wheel with respect to the normal direction of rotation of the firming wheel during use, whereby extraneous materials entering into the space between the firming wheel and the surface of the arm section tend to release themselves during rotation of the wheel.

6. In a double-disc opener having a pair of generally downwardly and forwardly converging discs which prepare a seed trench in the soil as the opener is advanced, an improved seed firming wheel assembly comprising:

an arm pivotally mounted between the discs for up and down swinging movement about a transverse axis located behind the axes of rotation of the discs, said arm being provided with means yieldably biasing a rear section of the arm in a downward direction; and a firming wheel rotatably supported on said rear section of the arm in such a position that a front portion of the firming wheel projects into a space defined between the two discs at the rear thereof while a rear portion of the firming wheel projects rearwardly beyond the discs, whereby to reduce the accumulation of trash and residue on the firming wheel during operation, said firming wheel comprising a non-spoked, circular disc having solid side faces and constructed from ultra-high-molecular-weight polyethylene, said arm being constructed from a single, flat metal plate carried in an upright-vertical plane between the discs with said vertical plane located on a fore-and-aft centerline between the discs, said rear section of the arm including a laterally offset tip portion to which the firming wheel is attached and beside which the firming wheel rotates during operation whereby to maintain the firming wheel on the fore-and-aft centerline of the discs, said tip portion of the arm being twisted out of a plane parallel to the plane of rotation of the firming wheel into a plane diverging forwardly away from the firming wheel with respect to the normal direction of rotation thereof.

7. In a double-disc opener having a pair of generally downwardly and forwardly converging discs which prepare a seed trench in the soil as the opener is advanced, an improved seed firming wheel assembly comprising:

an arm pivotally mounted between the discs for up and down swinging movement about a transverse axis located behind the axes of rotation of the discs, said arm being provided with means yieldably biasing a rear section of the arm in a downward direction; and a firming wheel rotatably supported on said rear section of the arm in such a position that a front portion of the firming wheel projects into a space defined between the two discs at the rear thereof while a rear portion of the firming wheel projects rearwardly beyond the discs, whereby to reduce the accumulation of trash and residue on the firming wheel during operation, said firming wheel comprising a non-spoked, circular disc having an outermost, circular periphery and solid side faces all constructed from the same material, said material comprising ultra-high-molecular-weight polyethylene.

8. In a double-disc opener as claimed in claim 7, said arm being constructed from a single, flat metal plate carried in an upright vertical plane between the discs with said vertical plane located on a fore-and-aft centerline between the discs, said rear section of the arm including a laterally offset tip portion to which the firming wheel is attached and beside which the firming wheel rotates during operation whereby to maintain the firming wheel on the fore-and-aft centerline of the discs.

9. In a double-disc opener as claimed in claim 7; and a generally upright mounting bracket having a pair of laterally spaced mounting ears depending from a lower end of the bracket, said arm being received between said ears and being connected to the latter by a transverse pivot for providing said up and down swinging movement of the arm.

10. In a double-disc opener having a pair of generally downwardly and forwardly converging discs which prepare a seed trench in the soil as the opener is advanced, an improved seed firming wheel assembly comprising:

an arm pivotally mounted between the discs for up and down swinging movement about a transverse axis located behind the axes of rotation of the discs, said arm being provided with means yieldably biasing a rear section of the arm in a downward direction;

a firming wheel rotatably supported on said rear section of the arm in such a position that a front portion of the firming wheel projects into a space defined between the two discs at the rear thereof while a rear portion of the firming wheel projects rearwardly beyond the discs, whereby to reduce the accumulation of trash and residue on the firming wheel during operation, said firming wheel comprising a non-spoked, circular disc having solid side faces and constructed from ultra-high-molecular-weight polyethylene; and a generally upright mounting bracket having a pair of laterally spaced mounting ears depending from a lower end of the bracket, said arm being received between said ears and being connected to the latter by a transverse pivot for providing said up and down swinging movement of the arm, said arm being generally S-shaped, having an upturned front section located forwardly of said transverse pivot and positioned along a front side of said bracket, said rear section of the arm being positioned rearwardly of said transverse pivot and being downturned to support the firming wheel rearwardly of said transverse pivot and below the same, said front section of the arm having a stop portion engageable with the bracket when the arm is at one limit of swinging movement whereby to preclude further downward positioning of the firming wheel relative to the discs.

11. In a double-disc opener as claimed in claim 10, said yieldable biasing means comprising a spring connected to said front section of the arm and biasing said stop portion thereof toward the bracket.

12. A seed firming wheel assembly for attachment to a generally upright, rigid member depending from the frame of a double-disc opener, said assembly comprising:

an elongated mounting bracket having a pair of laterally spaced mounting ears depending from a lower end of the bracket;

means adjacent a normally upper end of the bracket for securely attaching the bracket to said rigid member in such a manner that said mounting ears are disposed downwardly beyond a lower extremity of the mounting member;

a generally S-shaped arm received between said ears and pivotally connected to the latter at a point intermediate opposite ends of the arm by a transverse pivot to provide up and down swinging movement of the arm when the assembly is attached to the opener, said arm having an upturned front section on a front side of said transverse pivot and a downturned rear section on said rear side of said transverse pivot, said front section of the arm having stop means thereon disposed to abuttingly engage the mounting bracket and limit swinging movement of the arm in one direction;

spring means connected to said front section of the arm for yieldably biasing the arm in a direction to engage the stop means against the bracket; and a firming wheel rotatably mounted on said rear section of the arm, said firming wheel comprising a non-spoked, circular disc having solid side faces and constructed from ultra-high-molecular-weight polyethylene.

13. A seed firming wheel assembly as claimed in claim 12, said arm being constructed from a single, flat metal plate, said rear section of the arm including a laterally offset tip portion to which the firming wheel is attached and beside which the firming wheel rotates during operation.

14. A seed firming wheel assembly as claimed in claim 13, said tip portion of the arm being twisted out of a plane parallel to the plane of rotation of the firming wheel into a plane diverging forwardly away from the firming wheel with respect to the normal direction of rotation thereof.

15. A seed firming wheel assembly for attachment to a generally upright, rigid member depending from the frame of a double-disc opener, said assembly comprising:

an elongated mounting bracket having a pair of laterally spaced mounting ears depending from a lower end of the bracket;

means adjacent a normally upper end of the bracket for securely attaching the bracket to said rigid member in such a manner that said mounting ears are disposed downwardly beyond a lower extremity of the mounting member;

a generally S-shaped arm received between said ears and pivotally connected to the latter at a point intermediate opposite ends of the arm by a transverse pivot to provide up and down swinging movement of the arm when the assembly is attached to the opener, said arm having an upturned front section on a front side of said transverse pivot and a downturned rear section on said rear side of said transverse pivot, said front section of the arm having stop means thereon disposed to abuttingly engage the mounting bracket and limit swinging movement of the arm in one direction;

spring means connected to said front section of the arm for yieldably biasing the arm in a direction to engage the stop means against the bracket; and a firming wheel rotatably mounted on said rear section of the arm, said mounting bracket having a clearance slot in a lower end thereof aligned with said upper section of the arm for allowing the pass-through of extraneous foreign material during field operations.

16. In an opener having means for preparing a seed trench in the soil as the opener is advanced, an improved seed firming wheel assembly including:

a rotatable firming wheel;

an arm rotatably supporting said wheel in such a position that the wheel is disposed at least partially behind the trench preparing means with respect to the direction of travel of the opener for rotation about an axis transverse to said direction of travel and within the trench along the bottom thereof, said arm being pivotally mounted for up and down swinging movement about a transverse axis spaced above said axis of rotation of the wheel; and means yieldably biasing the arm in a direction to urge the wheel toward the bottom of the trench, said firming wheel comprising a non-spoked, circular disc having an outermost, circular periphery and solid side faces all constructed from the same material, said material comprising ultra-high-molecular-weight polyethylene.

17. In an opener as claimed in claim 16, said trench preparing means including a pair of side-by-side, downwardly and forwardly converging, circular, rotatable discs, said wheel being substantially smaller than said discs with a diameter that is no more than one-half the diameter of the discs.

18. In an opener as claimed in claim 17, said side faces of the wheel being flat and substantially parallel to one another.

19. In an opener as claimed in claim 18, said outermost, circular periphery being flat and extending between said side faces.

20. In an opener as claimed in claim 16, said side faces of the wheel being flat and substantially parallel to one another.

21. In an opener as claimed in claim 20, said outermost, circular periphery being flat and extending between said side faces.

22. A seed firming wheel assembly for attachment to the frame of a seed trench-forming opener including:

a mounting bracket;

means for securing the bracket to the frame of the opener;

an arm pivotally supported by the bracket;

a firming wheel rotatably mounted on the arm; and means for yieldably biasing the arm in such a direction as to urge the wheel away from the bracket, said firming wheel comprising a non-spoked, circular disc having an outermost, circular periphery and solid side faces all constructed from the same material, said material comprising ultra-high-molecular-weight polyethylene.

23. In an opener as claimed in claim 22, said trench preparing means including a pair of side-by-side, downwardly and forwardly converging, circular, rotatable discs, said wheel being substantially smaller than said discs with a diameter that is no more than one-half the diameter of the discs.

24. In an opener as claimed in claim 23, said side faces of the wheel being flat and substantially parallel to one another.

25. In an opener as claimed in claim 24, said outermost, circular periphery being flat and extending between said side faces.

26. In an opener as claimed in claim 22, said side faces of the wheel being flat and substantially parallel to one another.

27. In an opener as claimed in claim 26, said outermost, circular periphery being flat and extending between said side faces.

* * * * *